US012007099B2

(12) United States Patent
De Bevilacqua et al.

(10) Patent No.: US 12,007,099 B2
(45) Date of Patent: Jun. 11, 2024

(54) MULTI-FUNCTION LIGHTING APPARATUS

(71) Applicant: ARTEMIDE S.P.A., Milan (IT)

(72) Inventors: Carlotta Francesca Isolina Maria De Bevilacqua, Milan (IT); Andrea Gallucci, Milan (IT); Laura Pessoni, Milan (IT); Roberto Franzosi, Milan (IT)

(73) Assignee: ARTEMIDE S.P.A. (IT)

( * ) Notice: Subject to any disclaimer, the term of this patent is extended or adjusted under 35 U.S.C. 154(b) by 0 days.

(21) Appl. No.: 18/470,610

(22) Filed: Sep. 20, 2023

(65) Prior Publication Data

US 2024/0102636 A1 Mar. 28, 2024

(30) Foreign Application Priority Data

Sep. 20, 2022 (IT) ........................ 102022000019248

(51) Int. Cl.
*F21V 19/00* (2006.01)
*F21Y 113/13* (2016.01)
*F21Y 115/10* (2016.01)

(52) U.S. Cl.
CPC ....... *F21V 19/0015* (2013.01); *F21Y 2113/13* (2016.08); *F21Y 2115/10* (2016.08)

(58) Field of Classification Search
CPC .................................................. F21V 19/0015
See application file for complete search history.

(56) References Cited

U.S. PATENT DOCUMENTS

| | | | | |
|---|---|---|---|---|
| 2009/0084734 A1* | 4/2009 | Yencho | C02F 1/325 | 210/243 |
| 2013/0183749 A1* | 7/2013 | Aamodt | A61L 9/14 | 435/287.1 |
| 2014/0067130 A1* | 3/2014 | Pillai | A61L 9/00 | 315/297 |
| 2016/0030609 A1* | 2/2016 | Peterson | A61L 2/084 | 362/231 |
| 2018/0007845 A1* | 1/2018 | Martin | A01G 9/249 | |
| 2020/0314976 A1* | 10/2020 | Soer | H05B 47/105 | |

(Continued)

FOREIGN PATENT DOCUMENTS

WO 2021228671 A1 11/2021

OTHER PUBLICATIONS

Search Report issued in Italian Application No. 102022000019248.

*Primary Examiner* — Bryon T Gyllstrom
(74) *Attorney, Agent, or Firm* — The Belles Group, P.C.

(57) ABSTRACT

A multi-function lighting apparatus comprising a support structure, a light engine mounted on the structure, and a control unit controlling the light engine; the light engine comprising a first group of warm LEDs having color temperature ranging between 2000 and 2500 K and color rendering index ranging between 85 and 95; and a second group of cold LEDs having color temperature of at least 5000 K and color rendering index ranging between 65 and 75; the control unit being a two-channel driver control unit which controls independently the warm LEDs and the cold LEDs and is configured to control the light engine to emit white light with variable color temperature and luminous flux according to at least three different modes performing a lighting function, a plant maintenance function, and a sanification function respectively, as the color temperature and the luminous flux emitted by the light engine vary.

12 Claims, 2 Drawing Sheets

(56) References Cited

U.S. PATENT DOCUMENTS

| | | | | |
|---|---|---|---|---|
| 2021/0023250 | A1* | 1/2021 | Golkowski | A61L 2/26 |
| 2021/0330836 | A1* | 10/2021 | Lane | F21V 29/59 |
| 2022/0413166 | A1* | 12/2022 | Saccomanno | A23B 7/015 |
| 2023/0189411 | A1 | 6/2023 | Peeters et al. | |

* cited by examiner

MULTI-FUNCTION LIGHTING APPARATUS

CROSS-REFERENCE TO RELATED APPLICATIONS

This patent application claims priority from Italian patent application no. 102022000019248 filed on Sep. 20, 2022, the entire disclosure of which is incorporated herein by reference.

TECHNICAL FIELD

The present invention relates to a multi-function lighting apparatus that, in addition to performing a normal function of lighting environments, is also able to provide further functions aimed at limiting pathogenic agents and at plant maintenance.

CONTEXT

Lighting apparatuses are known that, in addition to having light sources suitable for lighting environments, are also equipped with light sources that emit light radiation with sanification capacities.

In addition to apparatuses provided with UV sources, apparatuses are also known that use visible spectrum sources, in particular in the violet area, for the sanification function.

For example, EP3915591A1 describes a lighting and sanification apparatus comprising a first light source that emits violet light having a wavelength ranging between 380 e 430 nm; a second light source that emits white light; and a third light source that emits a lime light having a peak wavelength ranging between 535 and 545 nm, such as to balance in color space the effect induced by the violet light emitted by the first source on the chromaticity coordinates of the white light emitted by the second source, so that the overall light resulting from the combination of light emitted by all the sources is a white light. In this manner, the apparatus can function in different modes: only lighting mode, only sanification mode, their combinations. The known apparatuses of the above type would appear to have further margins of improvement, particularly in terms of efficacy and versatility.

In particular, the use of violet light sources makes the presence necessary of further light sources that compensate for its emission, in a manner to provide a white light suitable for ambient lighting and that does not cause problems for users.

Furthermore, in environments where plants are present, the artificial lighting of normal lighting apparatuses is not suitable for the maintenance and well-being of the plants.

The well-being of plants can, in fact, also be facilitated, in unnatural environments such as the inside of a building, by appropriate lighting.

The known lighting devices, even though they are able to provide different luminous effects and various lighting intensities, are nonetheless not entirely satisfactory, since they do not allow the lighting conditions specifically useful to the well-being of human beings, the well-being of plants in an indoor environment and also an effective sanification function to be obtained simply and efficiently.

The known devices appear to be improvable, in particular, in terms of simplicity of construction, efficiency, dimensions and versatility.

SUMMARY

One object of the present invention is therefore to provide a multi-function lighting apparatus that is particularly simple, efficient and versatile, allowing a plurality of functioning modes suitable for different needs, such as to be used at different times of day.

One particular object of the present invention is to provide a variable-emission lighting device, in particular a device with LED light sources, that is, with respect to known solutions, able to provide lighting conditions that are useful and are not dangerous or contraindicated for the well-being of human beings and plants in an indoor environment, while simultaneously being, if not more, at least as efficient, simple and versatile as the known solutions.

The present invention therefore relates to a lighting apparatus as defined in essential terms in the attached claim 1 and, in its additional features, in the dependent claims.

The lighting apparatus of the invention is simple, efficient, functional and versatile, as it can provide effective ambient lighting, effective sanification against pathogenic microorganisms and an effective plant maintenance action.

The lighting apparatus of the invention has a single light engine configured to provide, controlled by the control unit, all the desired functions: a lighting function (with variable modes, such as to follow the circadian cycle, for example), a sanification function, a plant maintenance function.

For this purpose, the light engine is configured to emit white light with a color temperature variable according to need and, in particular, with three different spectra at different color temperatures: a warmer color temperature (between 2000 and 2500 K, indicatively about 2200 K) for the lighting function, an intermediate color temperature (between 3200 and 3700 K, indicatively about 3500 K) for the plant maintenance function, a colder color temperature (higher than or equal to 5000 K, indicatively about 6500 K) for the sanification function.

In particular, the light engine comprises two groups of LEDs: a first group of LEDs is formed of warm LEDs having color temperature ranging between 2000 and 2500 K, preferably about 2200 K, and color rendering index (CRI) ranging between 85 and 95, in particular about 90; and a second group of LEDs with color temperature equal to or higher than 5000 K, preferably about 6500 K, and color rendering index (CRI) ranging between 65 and 75, in particular about 70.

The LEDs of the two groups are opportunely carried by a printed circuit board (PCB) and are preferably organized in a modular manner. A single module comprises a plurality of warm LEDs and a plurality of cold LEDs, as defined above. Preferably, the module comprises the same number of warm LEDs and cold LEDs.

For example, the warm LEDs and cold LEDs are arranged aligned along one or more side-by-side rows (for example, two rows); in each row, the warm LEDs and the cold LEDs are arranged alternately; if there are several rows, the side-by-side rows have facing LEDs of different types, (i.e., a warm LED of a row is placed side-by-side with a cold LED of the other row).

Clearly, the module may comprise a different number of LEDs organized in a different manner to what is indicated as an example.

In the example shown, the module comprises 8 warm LEDs and the same number of cold LEDs arranged alternatively on two parallel rows; the two rows have side-by-side LEDs of a different type.

Each LED is associated with a refractive lens, for example in PMMA, positioned in front of the LED; and with an anti-glaring shield positioned around the lens.

The light engine is, for example, housed in a support structure, for example an aluminum profile that houses a plurality of modules aligned to create a linear system; it is clear that the modules can be installed in other different structures to form other configurations.

The light engine is controlled by a two-channel driver control unit which controls independently the warm LEDs and the cold LEDs, having respective different color temperatures, in a manner to define a "Tunable White" system that allows the overall color temperature emitted by the light engine to be controlled by varying the contribution of the warm LEDs and the cold LEDs.

Furthermore, the control unit adjusts the power supplied to the various LEDs, so as to adjust the total luminous flux.

The light engine is therefore configured to emit white light at a color temperature variable between 2000 K, using only the warm LEDs, and 7000 K, using only the cold LEDs, and also at all the intermediate temperatures, using combinations of warm LEDs and cold LEDs; and to emit a variable luminous flux at the various color temperatures.

In particular, the control unit is configured to control the light engine to operate in three different modes:

1) warm white light for lighting in the presence of users: color temperature ranging between 2000 K and 5000 K; total power ranging between 20 and 30 W; luminous flux ranging between 2500 and 3000 lm, for example about 2700 lm, at the color temperature selected; the warm LEDs are active and, optionally, the cold LEDs, in order to have the desired color temperature; the light engine is therefore supplied power with a variable current intensity for the warm LEDs (e.g. 2200 K) and the cold LEDs (e.g. 6500 K);
2) white light for plant maintenance: color temperature ranging between 3500 and 4000 K, for example about 3500 K; total power ranging between 60 and 80 W, for example about 70 W; luminous flux ranging between 3000 and 4000 lm for the warm LEDs (e.g. 2200 K) and between 5000 and 6000 lm for the cold LEDs (e.g. 6500 K); both the warm LEDs and the cold LEDs are active; for example, the light engine operates with color temperature 3500 K, total power 70 W, current to warm LEDs (2200 K) 750 mA, current to cold LEDs (6500 K) 750 mA, luminous flux 3500 lm for the warm LEDs (2200 K) and 5500 lm for the cold LEDs (6500 K); 3) white light for microbial containment: color temperature at least 5000 K, in particular ranging between 5000 and 6500 K; total power of at least 70 W; only the cold LEDs are active, whereas the warm LEDs are switched off; luminous flux higher than or equal to 10000 lm, for example about 10500 lm, for the cold LEDs; for example, the light engine operates with color temperature 6500 K, total power 70 W, current to warm LEDs (2200 K) 0 mA, current to cold LEDs (6500 K) 750 mA, luminous flux 10500 lm for the cold LEDs (6500 K).

For the plant maintenance function, the apparatus of the invention is intended for lighting of domestic and work environments (not greenhouses or other plant-growing environments) and its purpose is not growth of the plants, but only their maintenance: lighting between 1000 and 3000 lux average with white light at a color temperature around 3500-4000 K has therefore been identified as a minimum requirement for plant maintenance.

For microbial containment, scientific studies confirm that cold white light (5000-6500 K) at high lighting levels (over 3000 lux average) allows an effective sanification effect to be obtained, as demonstrated by experimental trials.

The apparatus of the invention is provided with an optical group characterized by a high efficiency and relatively narrow emission angle (with respect to common light apparatuses intended in particular for lighting environments and workstations), so as to obtain extremely high lighting values that allow the three specific functions of the apparatus and, in particular, in addition to ambient lighting:

with cold light (maximum color temperature obtainable by the light engine), an anti-microbial effect to be obtained, with the neutral light (intermediate color temperature), the plants to be provided with the lighting levels necessary for their maintenance in indoor environments.

In conclusion, the features of the apparatus allow the three envisaged functioning modes to be provided.

In particular, the apparatus has:

light output ratio (ratio between total flux emitted by the apparatus and the luminous flux emitted by the light sources functioning without apparatus, measured in the same conditions) higher than or equal to 80%, preferably 85%;

UGR lower than or equal to 16 (an extremely low value and indicator of high control of glare);

beam angle (beam angle emitted by the apparatus) lower than or equal to 2×35°, for example ranging between 2×30° and 2×35°, preferably lower than or equal to 2×33° (relatively narrow for a general lighting apparatus, but necessary to obtain the high lighting values on the horizontal plane required for the sanification and plant maintenance modes);

luminance lower than or equal to 1000 cd/m^2 over 50°;

efficacy, i.e., ratio between radiant power (luminous flux expressed in lumen) and absorbed electrical power (expressed in watts) higher than or equal to 150 lm/W, preferably higher than or equal to 155 lm/W.

BRIEF DESCRIPTION OF THE FIGURES

Further characteristics and advantages of the present invention will become apparent from the following non-limiting description of an embodiment thereof, with reference to the appended drawings, wherein.

DESCRIPTION OF EMBODIMENTS

Figure 1:
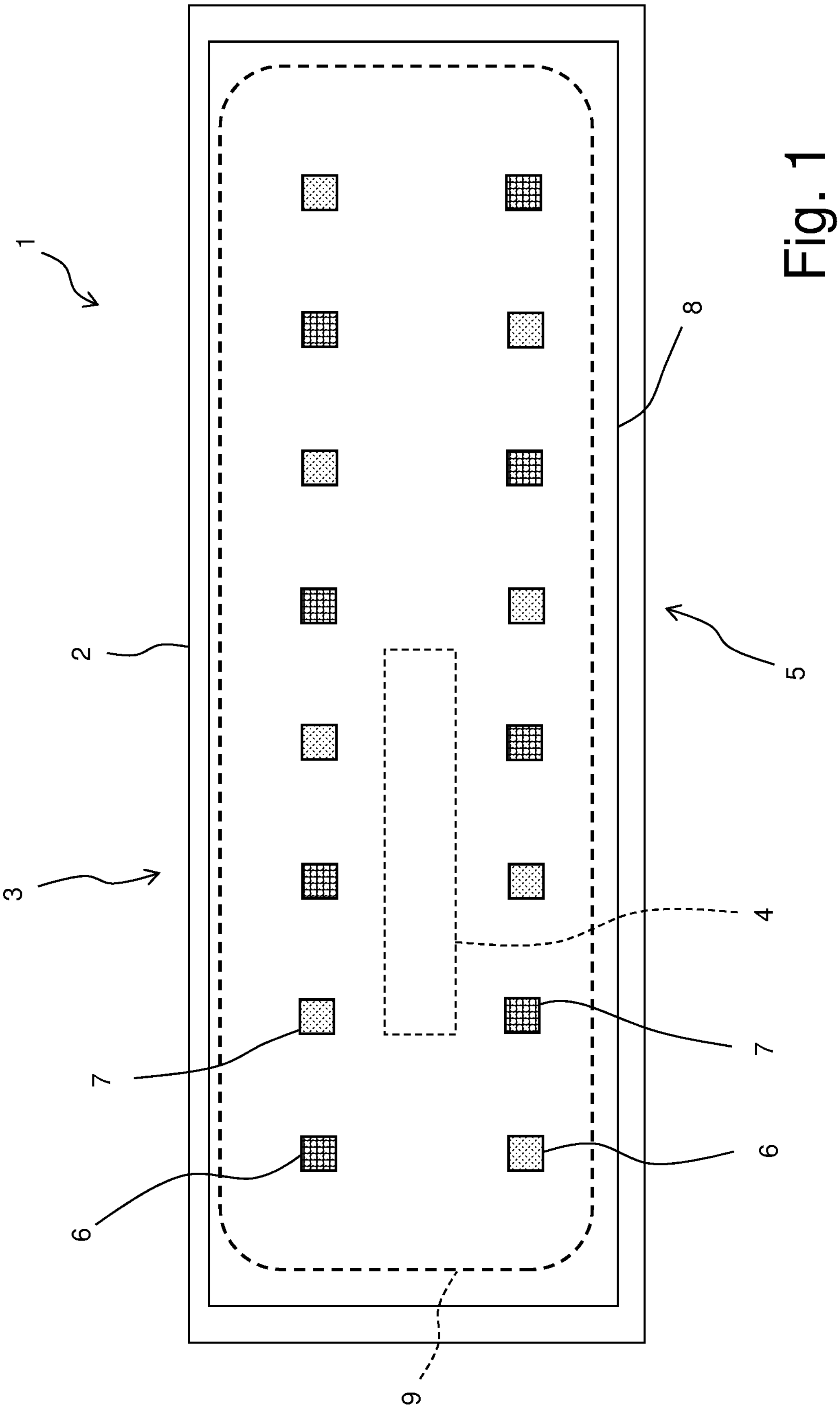
FIG. 1 is a schematic view of a multi-function lighting apparatus according to the invention.
Figure 2:
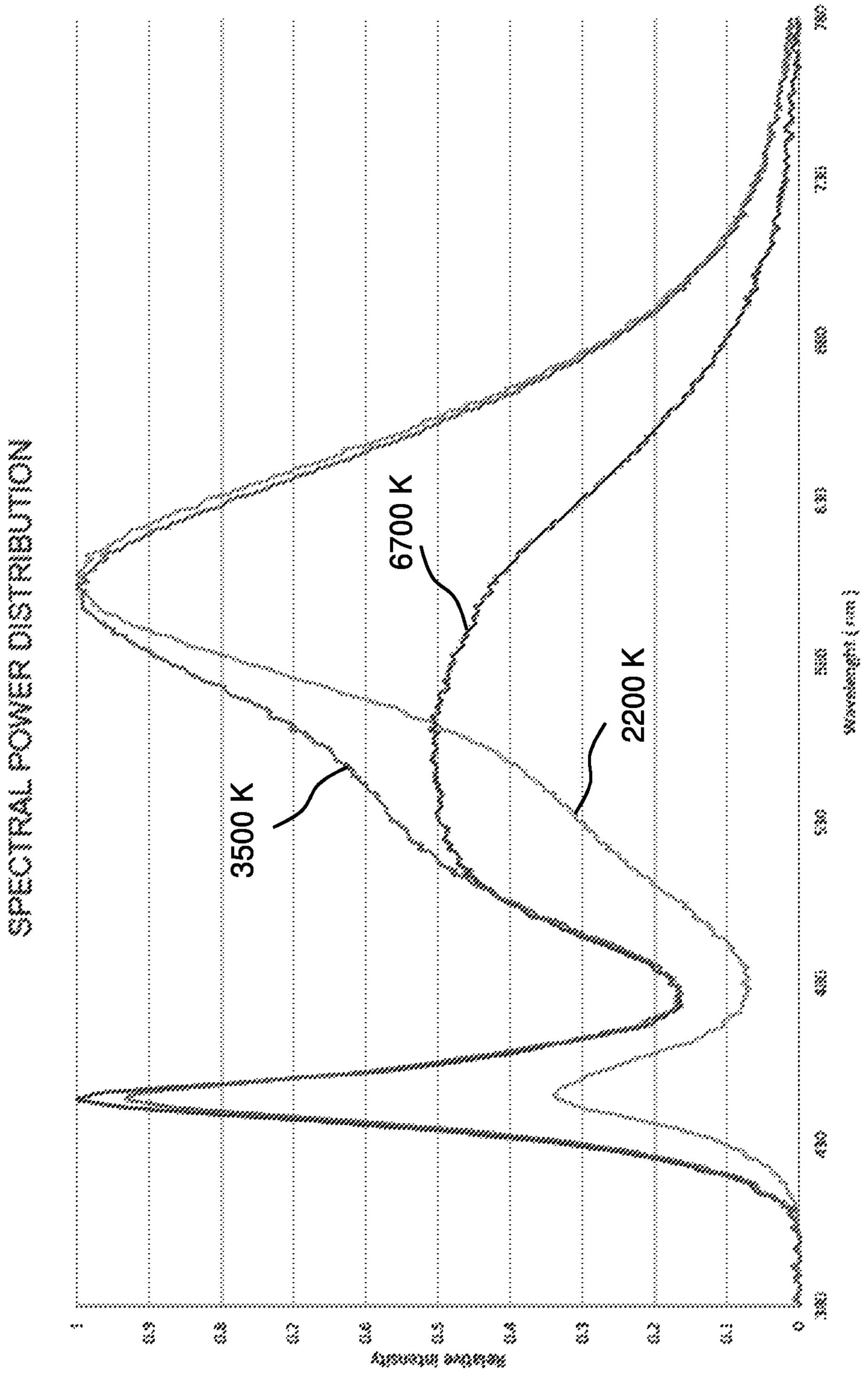
FIG. 2 is a graph that shows the spectral power distribution (SPD) of an apparatus according to the invention, operating in different functioning modes.

With reference to FIG. 1, the number 1 denotes in its entirety a multi-function lighting apparatus, namely intended for lighting of indoor environments (domestic and work environments).

The device 1 comprises a support structure 2, a light engine 3 mounted on the structure 2, and a control unit 4.

Advantageously, the apparatus 1 has a modular configuration and is formed of one or more modules 5.

In FIG. 1, a single module 5 is shown. Clearly, the apparatus 1 may comprise any number of modules 5 variously connected and organized with each other.

The structure 2 may be variously constructed and shaped, also depending on the type of apparatus 1.

For example, the structure 2 is formed of an aluminum body that creates a track system and comprises a plurality of modules 5.

The light engine 3 comprises a plurality of LEDs 6, 7 carried by a printed circuit board (PCB) 8.

The control unit 4 is operatively connected to the LEDs 6, 7 to control functioning (switch-on/switch-off and adjustment of intensity) of the LEDs 6, 7. The control unit 4 operates with a two-channel driver that independently controls the warm LEDs 6 and the cold LEDs 7.

Advantageously, the module 5 comprises an optical group 9, only schematically shown in FIG. 1, arranged facing the LEDs 6, 7, to collect and convey the light emitted by the LEDs 6, 7. In particular, the optical group 9 comprises a plurality of lenses, for example in PMMA, positioned in front of respective LEDs 6, 7, and an anti-glaring shield having a plurality of cells positioned about respective lenses.

The apparatus 1 of the invention has a single light engine 3 configured to provide all the desired functions: a lighting function (with variable modes, such as to follow the circadian cycle, for example), a sanification function, a plant maintenance function.

In particular, the light engine 3 is configured to emit white light with a color temperature variable according to need and, in particular, with three different spectra at different color temperatures:

- a warmer color temperature ranging between 2000 and 2500 K, indicatively about 2200 K, for the lighting function;
- an intermediate color temperature ranging between 3200 and 3700 K, indicatively about 3500 K, for the plant maintenance function;
- a colder color temperature, higher than or equal to 5000 K, indicatively about 6500 K, for the sanification function.

For this purpose, the light engine 3 comprises two groups of LEDs: a first group of LEDs is formed of warm LEDs 6 having color temperature ranging between 2000 and 2500 K, preferably about 2200 K, and color rendering index (CRI) ranging between 85 and 95, in particular about 90; and a second group of LEDs is formed of cold LEDs 7 with color temperature equal to or higher than 5000 K, preferably about 6500 K, and color rendering index (CRI) ranging between 65 and 75, in particular about 70.

In a preferred embodiment, the warm LEDs 6 have color temperature 2200 K and color rendering index 90; and the cold LEDs 7 have color temperature 6500 K and color rendering index 70.

All the LEDs 6, 7 are advantageously carried by the same board 8 and form the module 5. The module 5 therefore comprises a plurality of warm LEDs 6 and a plurality of cold LEDs 7, as defined above. Preferably, the module 5 comprises the same number of warm LEDs 6 and cold LEDs 7.

In the preferred embodiment shown, the warm LEDs 6 and the cold LEDs 7 are arranged aligned along two side-by-side parallel rows; in each row, the warm LEDs 6 and the cold LEDs 7 are arranged alternately and the rows have facing LEDs of different types (i.e., a warm LED 6 of a row is placed side-by-side with a cold LED 7 of the other row).

Clearly, the module 5 and therefore the light engine 3 may comprise a different number of LEDs 6, 7, organized in a different manner and arranged differently to what is indicated as an example.

In the example shown, the light engine 3 comprises eight warm LEDs 6 and the same number of cold LEDs 7 arranged alternatively on two parallel rows; the two rows have side-by-side LEDs 6, 7, of a different type.

According to the invention, the apparatus 1 has:

- light output ratio (ratio between total flux emitted by the apparatus and the luminous flux emitted by the light sources functioning without apparatus, measured in the same conditions) higher than or equal to 80%, preferably 85%;
- UGR lower than or equal to 16;
- beam angle (beam angle emitted by the apparatus) lower than or equal to 2×35°, for example ranging between 2×30° and 2×35°, preferably lower than or equal to 2×33°;
- luminance lower than or equal to 1000 cd/m^2 over 50°;
- efficacy, i.e., ratio between radiant power (luminous flux expressed in lumen) and absorbed electrical power (expressed in watts) higher than or equal to 150 lm/W, preferably higher than or equal to 155 lm/W.

The light engine 3 is controlled by a two-channel driver control unit 4 which controls independently the warm LEDs 6 and the cold LEDs 7, having respective different color temperatures, in a manner to define a "Tunable White" system that allows the overall color temperature emitted by the light engine 3 to be controlled by varying the contribution of the warm LEDs 6 and the cold LEDs 7. Furthermore, the control unit 4 adjusts the power supplied to the various LEDs 6, 7, so as to adjust the total luminous flux.

The light engine 3 is therefore configured to emit white light at a color temperature variable between 2000 K, using only the warm LEDs 6, and 6500 K (or above), using only the cold LEDs 7, and also at all the intermediate temperatures, using combinations of warm LEDs 6 and cold LEDs 7; and to emit a variable luminous flux at the various color temperatures.

In particular, the light engine 3 operates in three modes:

1) warm white light for lighting in the presence of users: color temperature ranging between 2000 K and 5000 K; total power ranging between 20 and 30 W; luminous flux ranging between 2500 and 3000 lm, for example about 2700 lm, at the color temperature selected; the warm LEDs are active and, optionally, the cold LEDs, in order to have the desired color temperature; the light engine is therefore supplied power with a variable current intensity for the warm LEDs (e.g. 2200 K) and the cold LEDs (e.g. 6500 K);
2) white light for plant maintenance: color temperature ranging between 3500 and 4000 K, for example about 3500 K; total power ranging between 60 and 80 W, for example about 70 W; luminous flux ranging between 3000 and 4000 lm for the warm LEDs (e.g. 2200 K) and between 5000 and 6000 lm for the cold LEDs (e.g. 6500 K); both the warm LEDs and the cold LEDs are active; for example, the light engine operates with color temperature 3500 K, total power 70 W, current to warm LEDs (2200 K) 750 mA, current to cold LEDs (6500 K) 750 mA, luminous flux 3500 lm for the warm LEDs (2200 K) and 5500 lm for the cold LEDs (6500 K);
3) white light for microbial containment: color temperature higher than or equal to 5000 K, in particular ranging between 5000 and 6500 K; total power of at least 70 W; only the cold LEDs are active, whereas the warm LEDs are switched off; luminous flux higher than or equal to 10000 lm, for example about 10500 lm, for the cold LEDs; for example, the light engine operates with color temperature 6500 K, total power 70 W, current to warm LEDs (2200 K) 0 mA, current to cold LEDs (6500 K) 750 mA, luminous flux 10500 lm for the cold LEDs (6500 K).

In conclusion, it is clear that further changes and variants may be made to the lighting apparatus described and shown here without deviating from the scope of the appended claims.

The invention claimed is:

1. A multi-function lighting apparatus comprising a support structure (2), a light engine (3) mounted on the structure (2), and a control unit (4) controlling the light engine (3); the light engine (3) comprising a first group of warm LEDs (6) and a second group of cold LEDs (7) carried by a printed circuit board (8); characterized in that the warm LEDs (6) have color temperature ranging between 2000 and 2500 K, preferably about 2200 K, and color rendering index (CRI) ranging between 85 and 95, in particular about 90; and the cold LEDs (7) have color temperature equal to or higher than 5000 K, preferably about 6500 K, and color rendering index (CRI) ranging between 65 and 75, in particular about 70; the control unit (4) being a two-channel driver control unit which controls independently the warm LEDs (6) and the cold LEDs (7) and is configured to control the light engine (3) to emit white light with variable color temperature and luminous flux according to at least three different modes performing a lighting function, a plant maintenance function, and a sanification function respectively having different color temperature and luminous flux emitted by the light engine (3); characterized in that the control unit (4) is configured to control the light engine (3) so that the light engine (3) operates selectively in three modes: a first lighting mode in the presence of users, with color temperature ranging between 2000 K and 5000 K, total power ranging between 20 and 30 W, and luminous flux ranging between 2500 and 3000 lm; a second plant maintenance mode, with color temperature ranging between 3500 and 4000 K, total power ranging between 60 and 80 W, and luminous flux ranging between 3000 and 4000 lm for the warm LEDs (6) and between 5000 and 6000 K for the cold LEDs (7); a third sanification mode, with color temperature equal to or higher than 5000 K, in particular ranging between 5000 and 6500 K, total power of at least 70 W, and luminous flux of at least 10000 lm for the cold LEDs.

2. The apparatus according to claim 1, wherein the warm LEDs (6) have color temperature 2200 K and color rendering index 90; and the cold LEDs (7) have color temperature 6500 K and color rendering index 70.

3. The apparatus according to claim 1, wherein the light engine (3) is configured to emit white light with three different spectra at different color temperatures: a warmer color temperature between 2000 and 2500 K, indicatively about 2200 K, for the lighting function; an intermediate color temperature between 3200 and 3700 K, indicatively about 3500 K, for the plant maintenance function; a colder color temperature, higher than or equal to 5000 K, indicatively about 6500 K, for the sanification function.

4. The apparatus according to claim 1, wherein all the LEDs (6, 7) are carried by a single board (8) and form a module (5) which can be combined with other identical modules.

5. The apparatus according to claim 1, wherein the warm LEDs (6) and the cold LEDs (7) are arranged aligned along two side-by-side parallel rows; in each row the warm LEDs (6) and the cold LEDs (7) are arranged alternately and the rows have facing LEDs of different types, i.e., a warm LED (6) of a row is placed side-by-side with a cold LED (7) of the other row.

6. The apparatus according to claim 1, wherein the control unit (4) is configured to adjust the power supplied to the warm LEDs (6) and the cold LEDs (7) so as to adjust the total luminous flux of the light engine (3).

7. The apparatus according to claim 1, wherein in the plant maintenance mode the light engine (3) is configured to operate with color temperature 3500 K; total power 70 W; current to the warm LEDs (6), having color temperature 2200 K, 750 mA; current to the cold LEDs (7), having color temperature 6500 K, 750 mA; luminous flux 3500 lm for the warm LEDs (6) at 2200 K and 5500 lm for the cold LEDs (7) at 6500 K.

8. The apparatus according to claim 1, wherein in the sanification mode the light engine (3) is configured to operate with color temperature 6500 K; total power 70 W; current to the warm LEDs (6) at 2200 K 0 mA; current to the cold LEDs (7) at 6500 K 750 mA; luminous flux 10500 lm for the cold LEDs (7) at 6500 K.

9. The apparatus according to claim 1, comprising an optical group (9) comprising a plurality of lenses positioned in front of respective LEDs (6, 7), and an anti-glaring shield having a plurality of cells positioned about respective lenses.

10. The apparatus according to claim 1, wherein the apparatus (1) has a beam angle lower than or equal to 2×35°; luminance lower than or equal to 1000 cd/m^2 over 50°; efficacy higher than or equal to 150 lm/W.

11. The apparatus according to claim 1, wherein the apparatus (1) has light output ratio higher than or equal to 80%, preferably 85%.

12. The apparatus according to claim 1, wherein the apparatus (1) has UGR lower than or equal to 16.

* * * * *